United States Patent [19]
Hutchison, IV et al.

[11] Patent Number: 6,118,250
[45] Date of Patent: Sep. 12, 2000

[54] POWER SUPPLY ASSEMBLY FOR HAND-HELD COMMUNICATIONS DEVICE

[75] Inventors: James A. Hutchison, IV, San Diego; Tad A. Hove, Riverside; Paul E. Peterzell, San Diego, all of Calif.

[73] Assignee: QUALCOMM Incorporated, San Diego, Calif.

[21] Appl. No.: 09/110,631

[22] Filed: Jul. 6, 1998

Related U.S. Application Data

[63] Continuation-in-part of application No. 09/027,354, Feb. 20, 1998.

[51] Int. Cl.[7] .......................... H01M 10/44; H01M 10/46
[52] U.S. Cl. ......................... 320/110; 320/125; 320/160
[58] Field of Search ..................................... 320/110, 116, 320/123, 125, 160

[56] References Cited

U.S. PATENT DOCUMENTS

| 5,440,221 | 8/1995 | Landau et al. | 320/155 |
| 5,684,384 | 11/1997 | Barkat et al. | 320/6 |
| 5,686,808 | 11/1997 | Lutz | 320/110 |
| 5,768,371 | 6/1998 | Snyder | 379/446 |

FOREIGN PATENT DOCUMENTS

| 0688082 | 6/1995 | European Pat. Off. | H02J 7/00 |

*Primary Examiner*—Edward H. Tso
*Attorney, Agent, or Firm*—Russell B. Miller; Charles D. Brown; Tom Streeter

[57] ABSTRACT

A portable phone has an internal battery and an external battery pack that is releasably attachable to the phone. A control unit in the phone controls connection of the respective batteries to a phone power input, depending on the detection of the external battery voltage. Whenever an external battery is present with a voltage above a predetermined minimum value, the external battery will be connected to the phone power input to provide power to operate the phone, so that the internal battery lifetime is extended. When the external battery voltage falls below the minimum value, or the external battery is removed, the unit automatically switches to internal battery power, so that the external battery can be changed without interrupting power supply to the phone, if the phone is on or during a call. An improved multi-phase software controlled battery-charging method and apparatus is used to charge the internal and external battery packs. The preferred battery-charging method uses a multi-phased charging approach comprising a trickle-charging phase, a fast-charging phase, and a top-off charging phase. The internal battery is charged to near-full capacity by trickle-charging (when required) and subsequently fast-charging the battery. The external battery is similarly charged to near-full capacity. Thus, both batteries are charged to near-full capacity in a substantially reduced charging time period as compared with the total charging time.

16 Claims, 4 Drawing Sheets

POWER SUPPLY ASSEMBLY FOR HAND-HELD COMMUNICATIONS DEVICE

CROSS-REFERENCE TO RELATED APPLICATIONS

This application is a continuation-in-part of application Ser. No. 09/027,354, filed Feb. 20, 1998, entitled "Power Supply Assembly for Portable Phone", hereby incorporated by reference. This invention is related to commonly assigned co-pending application Ser. No. 09/027,353, filed Feb. 20, 1998, entitled "External Battery Assembly for Portable Phone", also hereby incorporated by reference.

BACKGROUND OF THE INVENTION

1. Field of the Invention

This invention relates generally to power supplies for hand-held communication devices, and more particularly to methods for charging dual battery power supplies in a portable telephone.

2. Description of Related Art

The present invention relates generally to power supplies for portable phones, and is particularly concerned with a portable phone having at least one internal and external battery, and a power supply control system and method for the portable phone.

As described in the previously filed application Ser. No. 09/027,354 incorporated by reference herein, portable phones may have an internal battery for providing power, or an external battery which is releasably mounted on the phone body while in use, and is removed for re-charging when the phone is not in use. Batteries typically require changing after a large number of discharge and charge cycles, typically after 500 to 1000 cycles. When the battery is internal, the user must have access to the internal battery without disassembling the phone. This can involve a relatively complex procedure.

As internal components decrease in size, an internal battery dominates the overall length, width, and thickness of a portable phone. An external battery attached to the phone also involves extra plastic thickness in the overall phone assembly. Another problem with either internal or external batteries is potential loss of calls if the battery loses power during a call. In a conventional portable phone, it is not possible to change or re-charge the battery without turning off the phone.

Also, the current battery-charging techniques disadvantageously require a relatively long period of time to charge both the internal and external portable phone batteries to full capacity or near-full capacity. In one such approach, each battery is charged using a multi-phase battery-charging method comprising a trickle-charging phase, a fast-charging or rapid-charging phase, and a "top-off" charging phase. When necessary, the battery is charged in a first phase by providing a trickle-charge to the battery. The trickle-charge phase is required only when the battery has been discharged to a voltage level below a pre-determined minimum operating voltage of the portable phone. The battery-charging method transitions from trickle-charging to fast-charging when the detected battery voltage is higher than the minimum operating voltage of the phone. Finally, when the battery voltage reaches a pre-determined voltage threshold level at the end of the fast-charge, the method transitions to a "top-off" phase. This phase is necessary to avoid exposing the battery to excessive currents at the end of the charge that can decrease the life or reduce the capacity of the battery.

The current battery-charging techniques charge each battery to full capacity using this multi-phase battery-charging approach. For example, as described in the previously filed application Ser. No. 09/027,354, the internal battery is preferably charged to full capacity first, followed by the external battery. Disadvantageously, the phone user must wait a relatively long time for both the internal and external batteries to become fully charged. This is especially disadvantageous for active portable telephone users who often only have access to battery chargers for relatively short time periods. For example, salespeople may only be able to charge the batteries during a lunch hour and thus desire a relatively fast battery-charging technique. Therefore, a need exists for an improved battery-charging method and apparatus that is capable of charging both internal and external batteries of a portable phone to near-full capacity in a relatively short period of time. The present invention provides such an improved battery-charging method and apparatus.

SUMMARY OF THE INVENTION

The present invention is a novel method and apparatus for supplying power to a hand-held communications device such as a portable telephone. According to one aspect of the present invention, a power supply assembly for a portable phone is provided, comprising an internal battery for mounting in a portable phone housing, an external battery for releasable mounting on the phone housing, a control assembly connected to the internal and external batteries to control connection of the respective batteries to a phone power line, and a charge input connected to the control assembly for connection of a charging device to a selected battery. The control assembly includes first and second detectors for detecting the charge status of the respective internal and external batteries, first and second switches for controlling connection of the internal battery and the external battery to the phone power line, respectively, and a control unit having a first output signal for controlling the state of the first switch and a second output signal for controlling the state of the second switch, the control unit being responsive to the detector outputs to close the first switch and open the second switch if the charge status of the external battery is below a predetermined minimum value, and to open the first switch and close the first switch if the charge status of the external battery is above a predetermined minimum value, whereby the external battery provides power at all times when present and when the battery voltage is at or above the minimum value. If the external battery voltage falls low, the system automatically switches to internal battery power, so that a stable power source is guaranteed at all times. The minimum voltage is based on the minimum operating voltage of the phone.

The control unit is arranged to switch off the phone automatically if both batteries fall below a minimum voltage. Preferably, the control unit is also connected to the external charge input and detects when a charging voltage is present at the input, indicating that the batteries are to be charged. The unit controls charging of both the external and internal batteries, with the internal battery being charged first in one preferred embodiment. Preferably, both rapid-charge and trickle-charge inputs are provided for each battery from the charge input, and the control unit controls suitable switches to determine whether each battery is trickle-charged or rapid-charged, based on the detected battery voltage. The trickle-charge input is used to charge each battery when the battery voltage is below the minimum operating voltage of the phone, and the control unit switches automatically to rapid-charging when the battery voltage is detected to be higher than the minimum operating voltage.

In a preferred embodiment of the present invention, an improved multi-phase software controlled battery-charging method and apparatus is used to charge the internal and external batteries. The preferred battery-charging method uses a multi-phased charging approach comprising a trickle-charging phase, a fast-charging phase, and a top-off charging phase. The internal battery is preferably charged first by applying a trickle-charge (when required) until the battery voltage is greater than a minimum operating voltage of the phone. Once the battery voltage exceeds the minimum operating voltage of the phone, the internal battery is fast-charged to near-full capacity. The external battery is similarly charged to near-full capacity by applying a trickle-charge followed by a fast-charge. Thus, both the internal and external batteries are charged to near-full capacity in a substantially reduced charging time period as compared with the total time. After both batteries are charged to near-full capacity, the internal battery is charged to full capacity by applying a top-off charge to the battery. The external battery is similarly charged to full capacity during a subsequent top-off charging phase.

In a preferred embodiment of the invention, the internal battery is mounted on the inside of a door or back lid providing access to the interior of the phone housing. The external battery is designed to be mounted over the lid with contacts engaging corresponding contacts on the outside face of the lid. Pin contacts connect the internal battery and external battery contacts to the main circuit card assembly (CCA) of the phone. The pins contact corresponding pads on the main CCA for internal and external battery power, and to provide inputs to the control unit for controlling which battery provides power and which battery is charged when the external charger is connected to the phone. This arrangement allows the user to easily replace the internal battery without complicated tools or assembly instructions.

The power supply assembly of this invention provides a reliable and stable power source from the external or internal battery, and allows swapping of the external battery for a new external battery while the phone is in a call or turned on. The internal battery guarantees a stable power source at all times during the swapping process.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Figure 1:
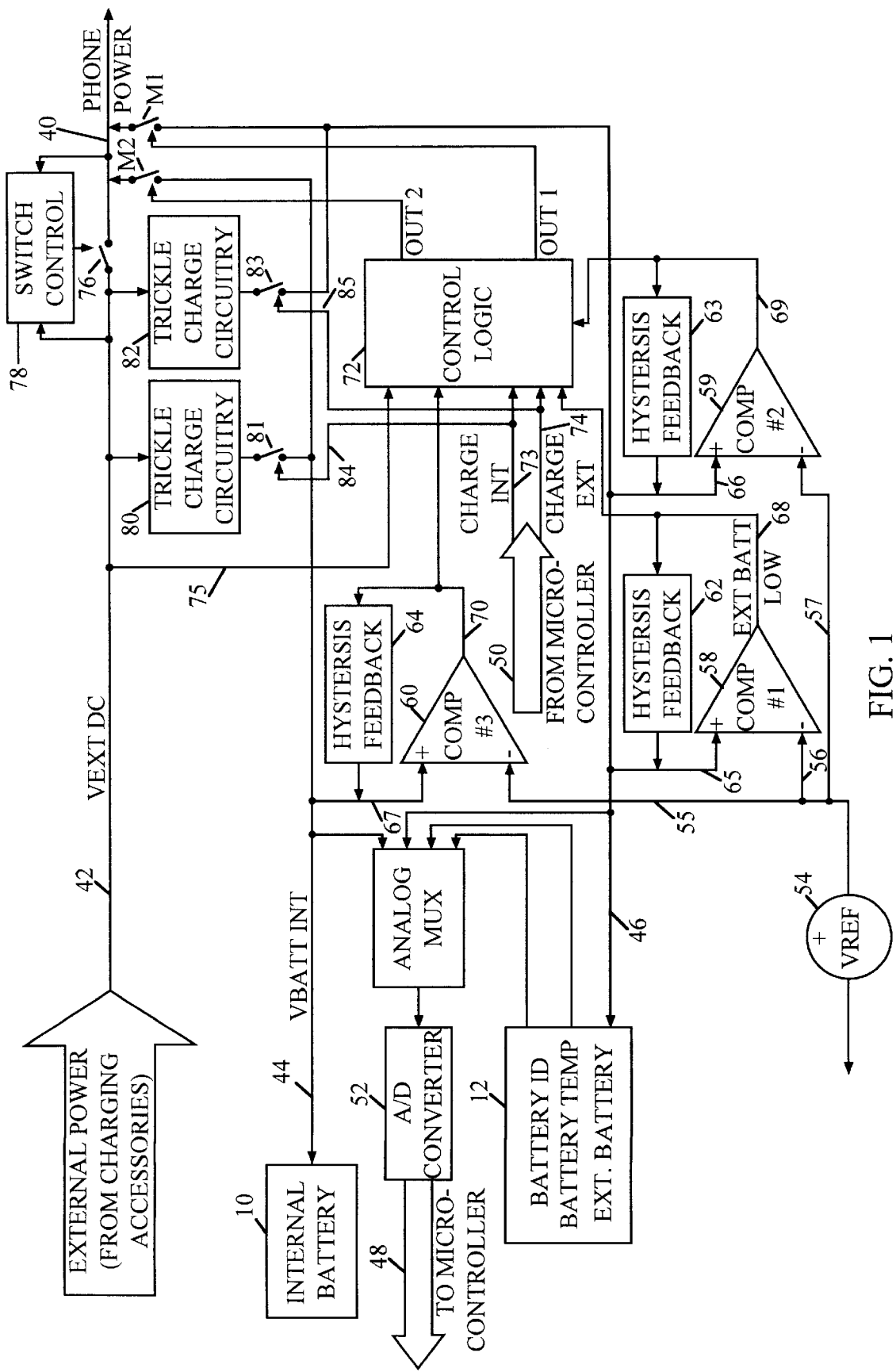
FIG. 1 is a diagram of the battery control and charging circuitry of a power supply assembly according to a preferred embodiment of the invention.
Figure 3:
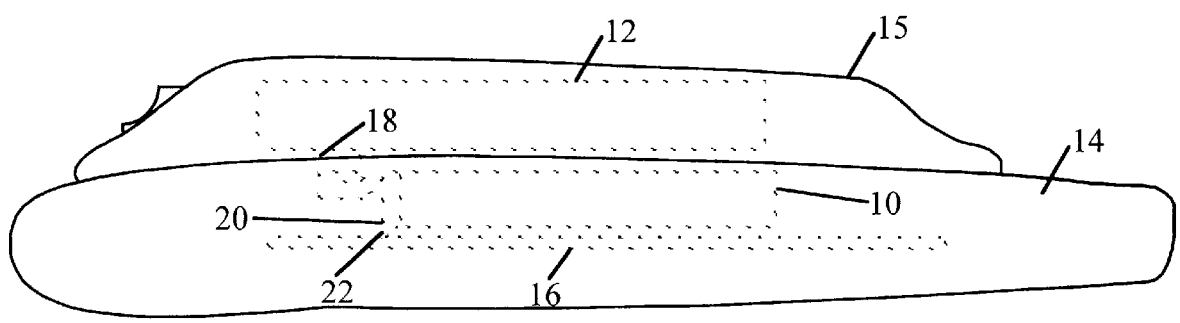
FIG. 3 is a side view of a portable telephone unit with an external battery pack attached.

FIG. 1 illustrates a battery control and charging circuit according to a preferred embodiment of the present invention for controlling power output from, and charging input to, a portable phone internal battery 10 and external battery 12. FIG. 3 illustrates a portable phone having a main body 14 and a releasable external battery pack or unit 15 secured to a rear wall of the main body. A main circuit card assembly 16 is mounted in the main body, and carries components and circuitry for the portable phone, as will be understood by those skilled in the field.

As described in more detail in application Ser. No. 09/027,353, filed Feb. 20, 1998, entitled "External Battery Assembly for Portable Phone", the contents of which are incorporated by reference herein, the internal battery 10 is preferably mounted on the inner face of a lid releasably mounted in the outer wall of the phone body, facing the CCA 16. Contacts in recesses on the outer face of the lid will contact leaf spring battery contacts 18 which project into the contact recesses when the battery pack is secured to the phone body, as described in the co-pending and related application referred to above.

The internal battery contacts are routed through a self-protection circuit and a flex circuit to conductive pogo pins 20 which match pad locations 22 on the main CCA for providing battery power to the phone. The arrangement of the removable lid and the pogo pin connectors allows the user to replace the internal battery easily without any disassembly of the phone. The contacts which connect to the external battery contacts 18 are also connected via a flex circuit to the pogo pins 20 for connection of external battery power to the phone.

This arrangement minimizes phone thickness and eliminates stack-up of components on the rear side of the CCA, leaving more space for integration of other accessories into the same volume as the base phone design, or as an additional external module which can be mated to the base phone. These accessories may use different contacts on the main CCA depending on the quantity and type of input/output required. Some examples of possible accessories, some or all of which may be integrated internally or externally into the phone CCA, are as follows: a smaller prismatic battery, FM radio, subscriber identification module (SIM), software enhancement module (e.g., drivers for different user interfaces, algorithms for improved performance, video games with dot-matrix display on the phone, etc.), hardware enhancements such as expanded phone-book memory, voice recording DSP/memory, vibrator, loudspeaker, voice recognition hardware/software module, video game firmware module, GPS receiver, and so on. The accessories may conveniently also be mounted on the inner face of the lid or phone outer wall, and connected via similar pogo pin contacts to contact pads on CCA 16.

These accessories allow users to buy and install features they most want and use on a daily basis. The arrangement permits other electronic devices, for example any of the enhancements referred to above, to be integrated into one common phone unit without compromising size, weight, or performance. Additional accessories may also be provided in the external battery unit if desired, for connection via the mating contacts, flex circuit, and pogo pins into the main CCA.

FIG. 1 is a schematic illustrating a control circuit that may be mounted on the main CCA for input/output to the external and internal battery, and an external charging unit. The circuit has an output line 40 for connection to the phone power input, an input 42 for connection to an external power input from a charging unit or accessory, an input/output line 44 to the internal battery 10, and an input/output line 46 to the external battery 12. The circuit also has a micro-controller output 48 and micro-controller input 50. Various battery outputs (voltage, battery temperature, battery ID) are connected via an analog to digital converter 52 to the micro-controller output, for monitoring of the battery condition. A reference voltage input 54 is also provided on line 55. Inputs 56,57 are provided from reference voltage line 55 to a first comparator 58 and a second comparator 59. Line 55 is also connected to a third comparator 60. Each comparator 58, 59, 60 has a hysterisis feedback 62, 63, 64, respectively.

A second input 65,66 to the first and second comparators, respectively, is provided from the external battery output 46. A second input 67 to the third comparator is provided from the internal battery output line 44. The comparator outputs 68, 69, 70, respectively, are each provided as inputs to a control logic module 72. Control logic module 72 also has internal charge and external charge control inputs 73,74 from the micro-controller input 50, and a control input 75 from the external charging power input line 42.

A switch 76 controlled by switch control device 78 controls connection of the external power charge input on line 42 to the battery charge inputs via switches M1, M2 for fast-charging of the batteries, as is also explained in more detail in Tables 1, 2 and 3. Line 42 is also connected via first trickle-charge circuitry 80 and switch 81 to the internal battery charge input via line 44, and via second trickle-charge circuitry 82 and switch 83 to the external battery charge input via line 46. The switch 81 is controlled by an internal charge signal on line 73 via line 84, and the switch 83 is controlled by an external charge signal on line 74, via line 85.

Figure 2:
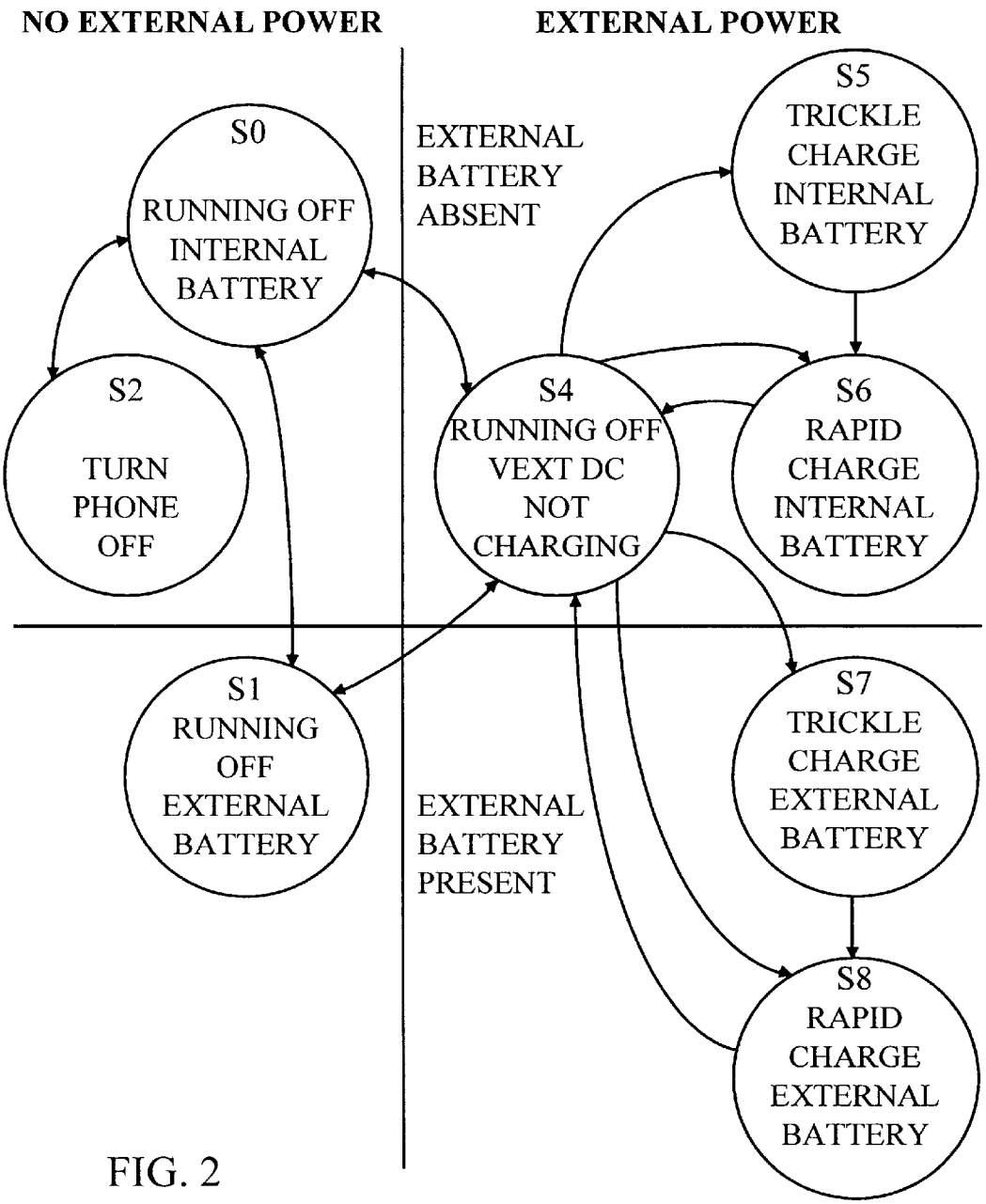
FIG. 2 is a battery control state diagram.

FIG. 2 is a battery control state diagram illustrating the possible battery control states S0 to S8 under the control of the control circuit as illustrated in FIG. 1 as well as programmed inputs from the micro-controller, as also explained in Table 1 below, which is a description and explanation of the various battery control states.

TABLE 1

Consolidated Battery control

| State | A VEXT DC | B EXT BATT LOW# | C FORCE TRKL EXT# | D CHARGE EXT | E FORCE TRKL EXT# | F CHARGE INT | OUT1 EXTERNAL | OUT2 INTERNAL | Interpretation |
|---|---|---|---|---|---|---|---|---|---|
| S0 | 0 | 0 | X | X | 1 | X | 1 | 0 | Running off internal battery |
| S1 | 0 | 1 | 1 | X | 1 | X | 0 | 1 | Running off external battery |
| S2 | 0 | 0 | X | X | 0 | X | 1 | 0 | Turn phone off. Internal battery empty. |
| S3 | 0 | 1 | 0 | X | X | X | 0 | 1 | Not valid. EXT_BATT_LOW# should go low first. |
| S4 | 1 | X | X | 0 | X | 0 | 1 | 1 | Running off VEXT. Not charging. |
| S5 | 1 | X | X | 0 | 0 | 1 | 1 | 1 | Trickle charge internal battery |
| S6 | 1 | X | X | 0 | 1 | 1 | 1 | 0 | Rapid charge internal battery |
| S7 | 1 | X | 0 | 1 | X | X | 1 | 1 | Trickle charge external battery |
| S8 | 1 | X | 1 | 1 | X | X | 0 | 1 | Rapid charge external battery |

Assumptions:
1. Software never turns on CHARGE_INT or CHARGE_EXT when VEXT_DC = 0
2. Software never turns on CHARGE_EXT and CHARGE_INT at the same time
3. EXT_BATT_LOW# goes low before FORCE_TRKL_EXT#
Consolidated Battery control, with EXT_BATT_LOW and FORCE_TRKL_EXT# combined
The main purpose of Comparator #1 is for hot swapping between internal and external batteries.

| State | A VEXT DC | B EXT BATT LOW# | C | D CHARGE EXT | E FORCE TRKL INT# | F CHARGE INT | OUT1 EXTERNAL | OUT2 INTERNAL | Interpretation |
|---|---|---|---|---|---|---|---|---|---|
| S0 | 0 | 0 | | X | 1 | X | 1 | 0 | Running off internal battery |
| S1 | 0 | 1 | | X | 1 | X | 0 | 1 | Running off external battery |
| S2 | 0 | 0 | | X | 0 | X | 1 | 0 | Software must turn phone off. Internal battery empty |
| S4 | 1 | X | | 0 | X | 0 | 1 | 1 | Running off VEXT. Not charging. |
| S5 | 1 | X | | 0 | 0 | 1 | 1 | 1 | Trickle charge internal battery |
| S6 | 1 | X | | 0 | 1 | 1 | 1 | 0 | Rapid charge internal battery |
| S7 | 1 | 0 | | 1 | X | X | 1 | 1 | Trickle charge external battery |
| S8 | 1 | 1 | | 1 | X | X | 0 | 1 | Rapid charge external battery |

Assumptions:
1. Software never turns on CHARGE_INT or CHARGE_EXT when VEXT_DC = 0
2. Software never turns on CHARGE_EXT and CHARGE_INT at the same time A first MOSFET switch M1 controls connection of the external battery I/O line 46 to the phone power output 40, and second MOSFET switch M2 controls connection of the internal battery I/O line 44 to the phone power output 40. The condition of the switches M1 and M2 is controlled by first and second signal outputs OUT1 and OUT2 from the control logic module, as explained in more detail in Tables 1, 2, and 3 below.

As indicated in FIG. 2 and Table 1, the battery control state S0 is when the internal battery is connected to the phone power input line 40. In this condition, switch M2 is closed and switches M1 and 76 are open. In control state S1, the external battery is connected to the phone input line 40, and switch M1 will be closed while switches M2 and 76 are open. In control state S4, the phone is running off the external power from the charging unit, i.e. switch 76 is closed and switches M1, M2 are open, and no charging is taking place, so switches 81 and 83 will also be open. In control state S5, the internal battery is being charged via the trickle-charge circuitry 80. In this state, switch 81 will be closed while switches M1, M2, 76, and 83 are all open. In control state S6, the internal battery is undergoing rapid-charge. In this state, switches 76 and M2 will be closed while all other switches are open. In control state S7, the external battery is trickle-charged via switch 83, which will be closed while all other switches are open. Finally, in control state S8, the external battery is rapid-charged and switches 76 and M1 are closed while all other switches are open.

Table 2 below indicates the various control signals and their interpretation, for better understanding of the various states in Table 1.

the software wants to charge the respective battery, which is only asserted if external power is present, or logic 0 if the software does not want to charge the respective battery. Signal E is the output 70 from the third comparator, FORCE.TRKL.INT, which is a logic 1 if the internal battery may be rapid-charged, and logic 0 if the internal battery should be trickle-charged.

The threshold voltage or reference voltage on line 55 is determined based on the operating voltage of the phone. In this example the threshold voltage is 3.4 volts, although other values may be possible. The hysterisis ranges and operating voltage can be determined once the operating voltage and load currents of the phone design are determined. The first comparator 58 requires sufficient hysterisis feedback to ensure that the output does not oscillate. The

TABLE 2

|   | Signal | Generated by | Logic | Interpretation |
|---|---|---|---|---|
| A | VEXT_DC | Charging accessories | 1 | External Power present |
|   |   |   | 0 | External Power absent |
| B | EXT_BATT_LOW# | Comparator #1 | 1 | External Battery Voltage >=3.4 volts + hysterisis EXACT Thresholds TBD |
|   |   |   | 0 | External Battery Voltage <3.4 volts |
| C | FORCE_TRKL_EXT# | Comparator #2 | 1 | Ok to rapid-charge External battery, VBATT_EXT >=3.4 v + hysterisis EXACT Thresholds TBD |
|   |   |   | 0 | Ok to trickle-charge External battery, VBATT_EXT <3.4 v |
| D | CHARGE_EXT | GPIO 26 (dig. Output) | 1 | Software wants to charge External battery — will only be asserted when External Power is present |
|   |   | (under Software Control) | 0 | Software does not want to charge the External battery |
| E | FORCE_TRKL_INT# | Comparator #3 | 1 | Ok to rapid-charge Internal battery, VBATT_INT >=3.4 v + hysterisis EXACT Thresholds TBD |
|   |   |   | 0 | Ok to trickle-charge Internal battery, VBATT_INT <3.4 v |
| F | CHARGE_INT | GPIO 9 (dig. Output) | 1 | Software wants to charge Internal battery — will only be asserted when External Power is present |
|   |   | (under Software Control) | 0 | Software does not want to charge the Internal battery |
| Out 1 | Vg External battery MOSFET |   | 1 | MOSFET to external battery off |
|   |   |   | 0 | MOSFET to external battery on |
| Out 2 | Vg Internal battery MOSFET |   | 1 | MOSFET to internal battery off |
|   |   |   | 0 | MOSFET to internal battery on |

The current battery control state is controlled by output signals from the control logic unit and the micro-controller, based on battery input signals and input signals from the three comparators. States S0 to S3 occur when there is no external voltage present on line 42, as indicated in Table 1, while states S4 to S8 occur when there is an external voltage VEXT.DC on line 42, as detected by the control logic module 72 on line 75. Thus, signal A is logic 1 when external power is present, and logic 0 when no external power is present.

Signal B in Tables 1 and 2 is the output from comparator 58, EXT.BATT.LOW, which occurs when the reference input 56 is higher than the input 65 from the external battery. Signal C is the output from the second comparator 59, FORCE.TRKL.EXT, which determines whether the battery will be rapid-charged or trickle-charged. Signal D is the CHARGE.EXT signal on line 74, while signal F is the CHARGE.INT signal on line 73. These signals will be 1 if minimum hysterisis voltage range is calculated by subtracting the voltage drop between the external cell at maximum discharge rate from the open-circuit voltage of the external cell. The main purpose of the first comparator is to allow hot swapping between the internal and external batteries.

The software is designed such that the system will normally be run by the external battery 12, and will only switch to the internal battery 10 if the external battery falls below the threshold voltage or is removed. Thus, as illustrated in FIG. 3, the system will run off the external battery when there is no external power and the external battery is present (S1), and will switch to state S0 automatically when the external battery is not present. This arrangement enables the user to remove and replace an external battery while the phone is on or in a call, without losing power. The internal battery provides a stable power source at all times during the battery swapping process.

The micro-controller software reads each battery voltage via the analog to digital converter 52, and continuously monitors the overall capacity of both battery packs, displaying the result on the phone monitor. If both the internal and external batteries are at or below 3.4 volts, the software will indicate a low battery condition to the user and will turn off the phone.

The micro-controller software also controls charging of the internal and external batteries via control signals D and F on lines 73 and 74. Only one of these will be activated at any time. In one preferred embodiment of the present invention, the internal battery is always charged first. The circuitry controls whether the battery is trickle-charged or fast-charged, using the second and third comparators 59 and 60. This may alternatively be done by the micro-controller software, if desired. In the illustrated embodiment, both comparators require sufficient hysterisis to ensure that the transition from trickle-charging to fast-charging occurs when the detected battery voltage is higher than the minimum operating voltage of the phone. The output of each comparator must be low when the battery voltage is less than 3.4 volts. The hysterisis value is dependent on the tolerance of the comparator circuit, and a tighter tolerance shortens the time spent in trickle-charge mode which would shorten the charging time to full capacity from a starting voltage near 3.4 volts.

The control circuit in conjunction with the micro-controller control inputs therefore automatically determines which battery provides the phone power input, and also determines the sequence of battery charging when external (charge) power is present, according to Tables 1 and 2 above. Table 3 below is a Karnough map of the battery switching logic for control logic module 72 having signal inputs A, B, D, E and F. The simplified OUT1 table is for a circuit in which comparators 1 and 2 are combined and signal C is eliminated, as indicated in the lower half of Table 1.

TABLE 3

Out1

| ABCD | 00 | 01 | 11 | 10 |
|---|---|---|---|---|
| 00 | 1 | 1 | 1 | 1 |
| 01 | 0 | 0 | 0 | 0 |
| 11 | 1 | 1 | 0 | 1 |
| 10 | 1 | 1 | 0 | 1 |

Out1 = ˜A&˜B +A&˜C + A&˜D

Simplified Out 1

| ABD | 00 | 01 |
|---|---|---|
| 00 | 1 | 1 |
| 01 | 0 | 0 |
| 11 | 1 | 0 |
| 10 | 1 | 1 |

Out1 = ˜B +A&˜D

Out2

| ABEF | 00 | 01 | 11 | 10 |
|---|---|---|---|---|
| 00 | 0 | 0 | 0 | 0 |
| 01 | 1 | 1 | 1 | 1 |
| 11 | 1 | 1 | 0 | 1 |
| 10 | 1 | 1 | 0 | 1 |

Out2 = ˜A&B +A&˜E+ A&˜F

The control circuit and software illustrated in FIGS. 1 and 2 and Tables 1 to 3 above automatically controls power supply to the phone circuitry and also controls charging of both the internal and external batteries. The software is designed to always provide power from the external battery when present, if it has a sufficiently high voltage and if no external power is present on line 40. If the external battery is detected removed or at too low a voltage level, the software is arranged to automatically switch to the internal battery. This enables users to swap one external battery pack for a new battery pack, even when the phone is switched on or during a call, without loss of signal. In one embodiment of the present invention, the software is designed to always charge the internal battery first, and to trickle-charge when necessary, followed by a fast-charge phase when the battery voltage is sufficiently high. This reduces charging time.

In a preferred embodiment, the software is designed to charge both the internal and the external batteries using an improved battery-charging method and apparatus of the present invention. In accordance with the preferred embodiment, the battery voltage levels are analyzed, and if necessary, the internal battery is trickle-charged during a trickle-charging phase of the improved battery-charging method. As described above with reference to FIGS. 1–2 and Tables 1 to 3, the internal battery is trickle-charged when its voltage is detected to be below a minimum operating voltage of the phone. In accordance with the improved battery-charging method, once the internal battery is sufficiently charged to the minimum operating voltage level, the battery-charging control circuit and software automatically transitions to a fast or rapid-charging phase during which the internal battery is charged to near-full capacity. Then, instead of charging the internal battery to full capacity by transitioning to a top-off battery-charging phase, the battery-charging control circuit and software proceed to trickle-charge the external battery if its voltage is detected below the minimum operating voltage of the phone. Similar to the charging of the internal battery, the external battery is then fast-charged whereby it is charged to near-full capacity in a relatively short period of time.

At the end of the fast-charging phase, the internal battery is "topped off" during a "top-off" charging phase wherein the internal battery is slowly charged to full capacity. As described above in the description of the related art, the battery must be slowly charged during this phase to avoid the use of excessive currents at the end of the charge that can decrease battery life and reduce battery capacity. In accordance with the improved battery-charging method of the present invention, once the internal battery is fully charged during the top-off phase, the external battery is then charged to full capacity during a subsequent top-off charging phase.

Advantageously, the improved battery-charging method and apparatus of the present invention enables a large percentage of battery charge to be accomplished in a relatively small percentage of the total charging time. Because both batteries are first fast-charged before being topped-off to full capacity, both batteries are charged to near-full capacity in a substantially reduced charging time period as compared with the prior art charging methods. The improved battery-charging method and apparatus of the preferred embodiment of the present invention are described in more detail below with reference to FIGS. 4 and 5.

The software reads each battery voltage via the analog to digital converter output 48, determines the overall capacity of both batteries, and displays the result. A temperature sensor is associated with each battery, and the temperature output is monitored, both to provide a more accurate determination of the battery capacity, and also to ensure that charging is only done if the temperature is within a predetermined range. The batteries will first be calibrated at room temperature from 3.2 V. to 4.2 V. to guarantee optimal accuracy. An optional external input for battery identification can be used to optimize the charging algorithm for different battery sizes.

Figure 4:
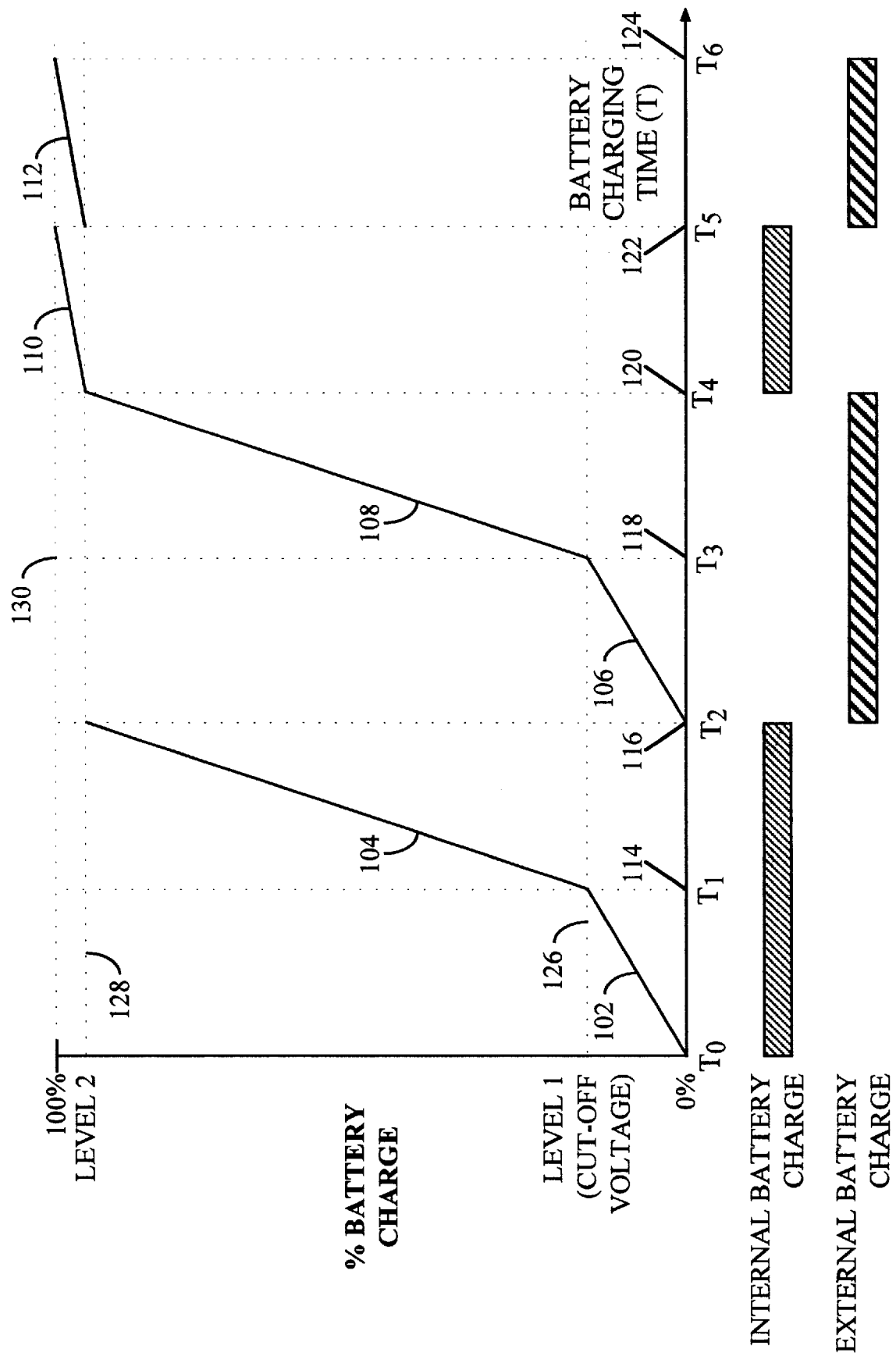
FIG. 4 is a graphical representation of the preferred battery-charging method of the present invention showing the percentage of battery charge capacity as a function of battery-charging time.

This system enables both an internal and external battery to be accommodated, determines which battery provides power at any time, and determines how and when each battery is re-charged, based on threshold voltages and hysterisis values controlled by the phone hardware, software, or a combination of both. The specifics of threshold voltage and hysterisis ranges are determined once the operating voltages and load currents of the phone design are determined. Although the battery connection to the phone power input is determined by hardware in the above example, it may alternatively be software controlled. The battery-charging mode and sequence is software controlled in this example, but may alternatively be hardware controlled. This system extends phone operation time between charging cycles by allowing an external battery to be used initially, and an internal battery to be switched in as appropriate. It also permits "hot swapping" of the external battery pack, as noted above. The system allows both the internal and external batteries to be connected to the phone while charging, ensuring in one preferred embodiment that the internal battery is charged first to maintain full charge. By using the external battery, when present, to provide power, the lifetime of the internal battery can be extended. The internal battery is readily accessible for changing when required, via the removable door on which it is mounted. The improved battery-charging method and apparatus of the preferred embodiment is now described with reference to FIGS. 4 and 5. FIG. 4 is a graphical representation of the battery-charging method of the present invention, showing the percentage of battery charge capacity (the y-axis) as a function of the battery-charging time (the x-axis). As shown in the graph of FIG. 4, the preferred battery-charging method uses a multi-phase charging technique, whereby each battery is charged (when necessary) using three distinct battery-charging phases: (1) a trickle-charging phase (optional), (2) a fast-charging phase (required), and (3) a "top-off" charging phase (required). The trickle-charging phase is considered "optional" because it is only required when the battery to be charged has a voltage level below a minimum operating voltage of the phone. As shown in FIG. 4, this voltage level is referred to as a level 1 "cut-off" voltage threshold 126. Therefore, when the battery to be charged holds a capacity greater than the cut-off threshold 126, this phase may be skipped and the battery can immediately be fast-charged. In addition, the point at which battery-charging begins depends upon the voltage capacity of the battery. For example, if the battery capacity is approximately 50%, the battery begins charging at this capacity until it is charged to near-full capacity.

Assuming that both batteries are discharged completely before the charging process commences, the improved charging method of the present invention preferably first charges the internal battery 10 (FIG. 1) by applying a trickle-charge to the battery during a trickle-charging phase 102 from $t_0$ to $t_1$ 114. The battery is charged slowly during the trickle-charging phase 102 to allow most of the current to be supplied to the phone and thereby maintain a minimum operating voltage to the phone. This technique ensures that the operating voltage to the phone remains above a minimum dropout voltage and ensures that the phone will not power-off during the trickle-charging phase 102. In the absence of a trickle-charging circuit, the battery would pull the phone's supply voltage down below the dropout threshold and the phone would power-off. Therefore, a current-limiting trickle-charge circuit is used which prevents the battery from pulling down the supply voltage below the dropout voltage. The trickle-charge 102 is applied until the battery reaches the cut-off level 126 (i.e., the minimum operating voltage of the phone).

When the internal battery reaches the cut-off level 126, this voltage level is detected by the micro-controller as described above with reference to FIGS. 1–2 and Tables 1–3. At time instant $t_1$ 114, the micro-controller causes the battery-charging circuit to transition from the trickle-charging phase 102 to a fast-charging or rapid-charging phase 104 in the manner described above. At this point, the battery can be supplied with full current (i.e., the current limiting circuit utilized during the trickle-charging phase is no longer required) because the power supply can now "float" off of the battery voltage. As shown in FIG. 4, the internal battery is fast-charged to near-full capacity in a relatively short charging time period ($t_1$ 114 to $t_2$ 116) as compared to the total charging time period required to fully charge the internal battery. When the internal battery reaches near-full capacity (at a pre-determined threshold "level 2" 128 as shown in FIG. 4) at time instant $t_2$ 116, the improved charging method of the present invention begins to charge the external battery 12.

As described above, the phase used to charge the external battery 12 depends upon its detected voltage level. For example, if the external battery 12 is fully discharged as shown in FIG. 4, a trickle-charge 106 is applied to the external battery until it is charged to the cut-off level 126. However, if the external battery 12 has a voltage exceeding the minimum operating voltage of the phone, the battery can be immediately fast-charged during a fast-charging phase 108 from time instant $t_3$ 118 to $t_4$ 120. Similar to the internal battery 10, the external battery 12 is charged to near-full capacity at the end of the fast-charging phase 108 ($t_3$ to $t_4$). Thus, in a relatively short period of time (from $t_0$ to $t_4$) as compared to the total charging time required to fully charge both batteries (from $t_0$ to $t_6$), both the internal battery 10 and external battery 12 are charged to near-full capacity. Consequently, the improved charging method of the present invention allows a portable phone user to charge both batteries to near-full capacities in a relatively short period of time as compared with the current battery-charging techniques.

As shown in FIG. 4, the batteries are charged to full capacity during top-off charging phases 110 and 112. In accordance with the present invention, the internal battery is preferably "topped off" to full capacity first during an internal battery top-off charging phase 110 ($t_4$ 120 to $t_5$ 122). The external battery is then topped-off to full capacity during an external battery top-off phase 112 ($t_5$ 122 to $t_6$ 124). The charging rates used during the top-off charging phases 110, 112 are less than those used during the fast-charging phase. As described above, this slow charging rate used during the top-off battery-charging phase is necessary to avoid damaging the battery when approaching the end of the charging period. As is well known in the battery art, at the end of the charging period the batteries must be charged slowly to avoid exposing them to excessive currents and thereby causing them to be permanently damaged. At the end of the external battery top-off charging phase 112, at time instant $t_6$, both batteries are charged to full capacity.

The improved battery-charging method of the present invention can be modified for use with N batteries where N is greater than two. For example, consider the case where four batteries are employed, three external and one internal. In one embodiment, the method first charges the internal battery to near-full capacity using the trickle-charging phase 102 (if necessary) followed by the fast-charging phase 104. A first external battery is then charged to near-full capacity as described above by first applying a trickle-charge (if necessary) during the trickle-charging phase 106 followed by the fast-charging phase 108 as shown in FIG. 4. The second external battery is similarly charged to near-full capacity (trickle-charge if required and then fast-charged). Finally, the third external battery is then charged using the same trickle-fast charging-phase approach. Thus, all four batteries are charged to near-full capacity in a significantly reduced charging period as compared to the total charging time required to fully charge the batteries. In accordance with the improved battery-charging method of the present invention, the internal battery is then topped off to full charge capacity during a top-off charging phase 110. The remaining three batteries are similarly topped off to full capacity during successive top-off charging phases. One skilled in the art will appreciate that this "trickle/fast, trickle/fast, trickle/fast . . . top-off, top-off, top-off" charging technique can be applied to any number of phone batteries.

In addition, if the phone requires more than one internal battery, the preferred embodiment will similarly charge the internal batteries first before charging the external batteries. For example, if two internal batteries are used, the two internal batteries are charged to near-full capacity by applying a trickle-charge to the first internal battery, followed by a fast-charge as described above with reference to FIG. 4. The second internal battery is similarly charged to near-full capacity, followed by the external batteries.

In one alternative embodiment of the present invention, the charging rates used during the different charging phases are dictated by specifications provided by the battery cell manufacturers. As described above with reference to FIGS. 1 and 2 and Tables 1–3, battery profiles can be specified in a battery ID that is input to the micro-controller. One of the battery profiles included in the battery ID is a recommended rate of charge. For batteries that have a fast-charging capability (e.g., lithium-ion batteries), the present improved charging method significantly shortens the amount of time required to charge the batteries to near-full capacity. In an alternative embodiment of the present improved battery-charging technique, the charging method is optimized using the battery profile information input to the micro-controller via an optional external input. For example, in one alternative, the battery-charging method can be optimized for different types of batteries and for different battery sizes. In addition, as described above, the battery-charging method can continuously measure the battery temperature and continue charging only if the battery temperature is within a pre-determined range.

Figure 5:
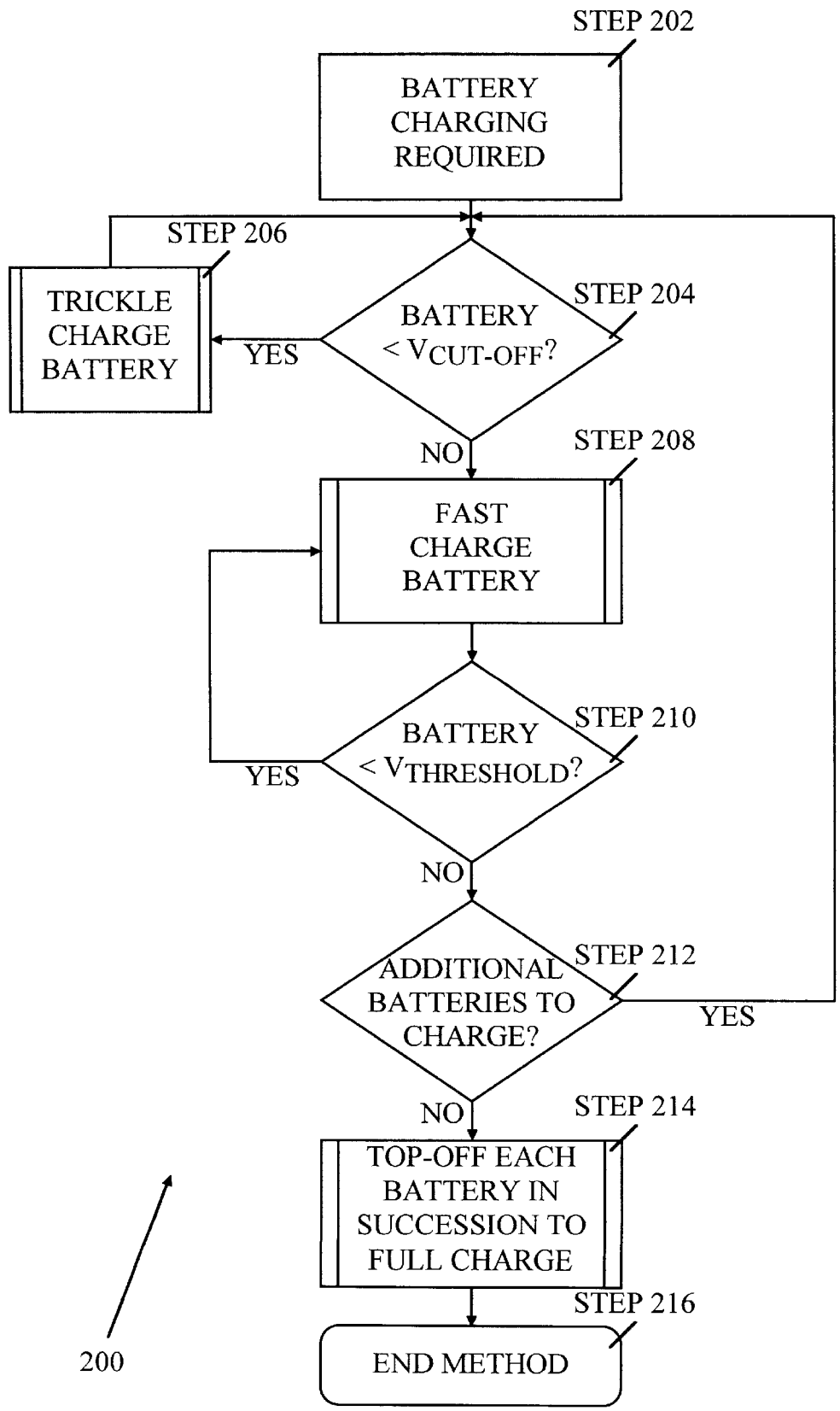
FIG. 5 shows a flowchart of the preferred multi-phase battery-charging method of the present invention.

FIG. 5 shows a flowchart of the preferred battery-charging method 200 of the present invention. The preferred charging method shown in FIG. 5 is preferably implemented in software that is executed by the micro-controller and charging circuits described above with reference to FIGS. 1–2 and Tables 1–3. The method proceeds to STEP 202 whenever the micro-controller determines that battery-charging is required. As described above with reference to FIGS. 1–2, and Tables 1–3, the micro-controller is able to detect the presence of a charging voltage generated by an external charging device. In one embodiment, the presence of the charging voltage at an input will cause the micro-controller to execute the charging method 200 and proceed to STEP 202.

In the preferred embodiment, the internal battery (or batteries, if more than one internal battery is present) is charged to near-full capacity before the external batteries are so charged. Alternatively, the external batteries can be charged to near-full capacity before the internal batteries are so charged. In accordance with the present invention, the method proceeds to a decision STEP 204 whereat the battery voltage level is measured and compared to the minimum operating voltage of the phone (referred to as $V_{cut\text{-}off}$). As described above with reference to FIG. 4, if the battery is below a minimum operating voltage of the phone, the battery must first be trickle-charged to avoid inadvertently powering down the phone. Therefore, if the battery voltage is below $V_{cut\text{-}off}$ at the decision STEP 204, the method proceeds to a STEP 206 whereat the battery is trickle-charged as described above. The battery will continue to be trickle-charged until its voltage is determined to be equal to or greater than $V_{cut\text{-}off}$ at the decision STEP 204.

Once the battery is sufficiently charged to a voltage that exceeds the minimum operating voltage of the phone (i.e., the battery voltage is no longer below $V_{cut\text{-}off}$), the method proceeds from the STEP 204 to a STEP 208 whereat the battery is fast-charged as described above. The battery will continue to be fast-charged until it reaches a near-full capacity threshold. This threshold is referred to in FIG. 5 as "$V_{threshold}$", which is synonymous to the level 2 voltage level 128 of FIG. 4. In one preferred embodiment $V_{threshold}$ is dependent upon the battery type used to implement the internal and external batteries. $V_{threshold}$ is therefore specified by the battery cell manufacturers and can be configured through software. As shown in FIG. 5, the method compares the battery voltage to $V_{threshold}$ at a decision STEP 210. When the battery voltage exceeds $V_{threshold}$ the method proceeds to a decision STEP 212 to determine whether additional batteries require charging. If additional batteries require charging (e.g., an external battery as described above with reference to FIG. 4), the additional batteries are charged to near-full capacity using the "trickle/fast, trickle/fast, etc.", approach described above with reference to STEPS 204–210. Thus, using the preferred battery-charging method shown in FIG. 5, the batteries are charged to near-full capacity in a substantially reduced time period compared to the total required charging time.

Once all of the batteries that require charging have been charged to near-full capacity, the method proceeds from STEP 212 to STEP 214 to top-off each battery in the order that they were charged to near-full capacity. For example, in the case of a dual battery phone (one internal, one external), the internal battery is first charged to full capacity at STEP 214 during a top-off battery-charging phase. Once the internal battery is fully charged, the external battery is then charged to full capacity. The method then terminates at STEP 216 and control is returned to the micro-controller to allow it to perform other important functions.

In summary, the invention includes an improved multi-phase or multi-stage software controlled battery-charging method and apparatus for charging multiple batteries in a portable telephone. The preferred battery-charging method uses a multi-phased charging approach comprising a trickle-charging phase, a fast-charging phase, and a top-off charging phase. The rate of charge depends upon the charging phase as different phases use different charging rates. In one preferred embodiment, the internal batteries are charged before the external batteries are charged. The internal battery is charged by first applying a trickle-charge (when required) until the battery voltage is greater than a minimum operating voltage of the phone. Once the battery voltage exceeds the minimum operating voltage of the phone, the internal battery is fast-charged to near-full capacity. Successively trickle-charging and then fast-charging each external battery similarly charges the external batteries to near-full capacity. Once all of the batteries are charged to near-full capacity, they are successively charged to full capacity by applying a top-off charge to each battery. Thus, the improved charging method and apparatus provides a means for charging both the internal and external batteries to near-full capacity in a substantially reduced charging time period as compared with the total charging time.

A number of embodiments of the present invention have been described. Nevertheless, it will be understood that various modifications may be made without departing from the spirit and scope of the invention. For example, although the internal battery is preferably charged first, the method can be modified to charge the external battery first. Similarly, in an alternative embodiment, instead of first charging the internal battery to near-full capacity, it is charged only to a pre-determined percentage of voltage capacity (e.g., 60% capacity) whenever the external battery is completely discharged. Similarly, the internal and external batteries may alternatively be charged to certain capacities depending upon their relative capacities. For example, in one alternative embodiment, if the internal battery is above a first pre-determined threshold capacity (e.g., 60% capacity), and the external battery is below a second pre-determined threshold capacity (e.g., 40% capacity), the external battery is charged first. Those skilled in the battery-charging art will appreciate that these thresholds can be varied to meet system requirements. In another alternative, the method uses an algorithm to minimize the charging time necessary to achieve a maximum phone supply capacity based upon the relative charging characteristics of the batteries. In this alternative embodiment, the method selects the battery to charge first based upon the relative fast-charging characteristics of the batteries. For example, if the external battery has a superior fast-charging time characteristic as compared to the internal battery, the alternative method charges the external battery first to obtain the most phone power supply current in the shortest charging time period.

Accordingly, it is to be understood that the invention is not to be limited by the specific illustrated embodiment, but only by the scope of the appended claims.

What is claimed is:

1. A method of charging an internal and external battery in a power supply assembly of a portable phone, wherein the phone has a battery-charging control unit for charging the phone batteries using a plurality of battery-charging rates, comprising the steps of:

a) comparing the voltage of the internal battery to a pre-determined cut-off voltage;
   b) applying a trickle-charge to the internal battery if the voltage of the internal battery compared in step (a) is less than the cut-off voltage, wherein the trickle-charge is applied until the voltage of the internal battery exceeds the cut-off voltage;
   c) applying a fast-charge to the internal battery until the internal battery voltage exceeds a pre-determined voltage threshold;
   d) comparing the voltage of the external battery to the pre-determined cut-off voltage;
   e) applying a trickle-charge to the external battery if the voltage of the external battery compared in step (d) is less than the cut-off voltage, wherein the trickle-charge is applied until the voltage of the external battery exceeds the cut-off voltage;
   f) applying a fast-charge to the external battery until the external battery voltage exceeds the pre-determined voltage threshold;
   g) applying a top-off charge to the internal battery until the internal battery is fully charged; and
   h) applying a top-off charge to the external battery until the external battery is fully charged.

2. The battery-charging method of claim 1, wherein the cut-off voltage comprises a pre-determined minimum operating voltage of the portable phone.

3. A method of charging an internal and external battery in a power supply assembly of a portable phone, wherein the phone has a battery-charging control unit for charging the phone batteries using a plurality of battery-charging rates, comprising the steps of:

a) comparing the voltage of the internal battery to a pre-determined cut-off voltage;
   b) applying a trickle-charge to the internal battery if the voltage of the internal battery compared in step (a) is less than the cut-off voltage, wherein the trickle-charge is applied until the voltage of the internal battery exceeds the cut-off voltage;
   c) applying a fast-charge to the internal battery until the internal battery voltage exceeds a pre-determined voltage threshold;
   d) comparing the voltage of the external battery to the pre-determined cut-off voltage;
   e) applying a trickle-charge to the external battery if the voltage of the external battery compared in step (d) is less than the cut-off voltage, wherein the trickle-charge is applied until the voltage of the external battery exceeds the cut-off voltage;
   f) applying a fast-charge to the external battery until the external battery voltage exceeds the pre-determined voltage threshold;
   g) applying a top-off charge to the internal battery until the internal battery is fully charged; and
   h) applying a top-off charge to the external battery until the external battery is fully charged;

wherein:
   i) the cut-off voltage comprises a pre-determined minimum operating voltage of the portable phone; and
   j) the pre-determined minimum operating voltage of the portable phone comprises 3.4 volts.

4. A method of charging an internal and external battery in a power supply assembly of a portable phone, wherein the phone has a battery-charging control unit for charging the phone batteries using a plurality of battery-charging rates, comprising the steps of:

a) comparing the voltage of the internal battery to a pre-determined cut-off voltage;
   b) applying a trickle-charge to the internal battery if the voltage of the internal battery compared in step (a) is less than the cut-off voltage, wherein the trickle-charge is applied until the voltage of the internal battery exceeds the cut-off voltage;
   c) applying a fast-charge to the internal battery until the internal battery voltage exceeds a pre-determined voltage threshold;
   d) comparing the voltage of the external battery to the pre-determined cut-off voltage;
   e) applying a trickle-charge to the external battery if the voltage of the external battery compared in step (d) is less than the cut-off voltage, wherein the trickle-charge is applied until the voltage of the external battery exceeds the cut-off voltage;
   f) applying a fast-charge to the external battery until the external battery voltage exceeds the pre-determined voltage threshold;
   g) applying a top-off charge to the internal battery until the internal battery is fully charged; and
   h) applying a top-off charge to the external battery until the external battery is fully charged;
   wherein the trickle-charge steps (b) and (e) allow a majority of the charging current to be supplied to the phone and thereby maintain a minimum operating voltage to the phone.

5. The battery-charging method of claim 1, wherein the fast-charge steps (c) and (f) include charging the battery with a full charging current until the batteries obtain a near-full voltage capacity.

6. The battery-charging method of claim 5, wherein the fast-charge steps (c) and (f) charge the battery at a much faster rate than do the trickle-charge steps (b) and (e) and the top-off charge steps (g) and (h).

7. A method of charging internal and external batteries in a power supply assembly of a portable phone, comprising the steps of:
   a) comparing the voltage of an internal battery to a pre-determined cut-off voltage;
   b) applying a trickle-charge to the internal battery if the voltage of the internal battery compared in step (a) is less than the cut-off voltage, wherein the trickle-charge is applied until the voltage of the internal battery exceeds the cut-off voltage;
   c) applying a fast-charge to the internal battery until the internal battery voltage exceeds a pre-determined voltage threshold;
   d) determining whether the portable phone has another internal battery, and if so, repeating steps (a)–(c) for each remaining internal battery;
   e) comparing the voltage of an external battery to the pre-determined cut-off voltage;
   f) applying a trickle-charge to the external battery if the voltage of the external battery compared in step (e) is less than the cut-off voltage, wherein the trickle-charge is applied until the voltage of the external battery exceeds the cut-off voltage;
   g) applying a fast-charge to the external battery until the external battery voltage exceeds the pre-determined voltage threshold;
   h) determining whether the portable phone has another external battery, and if so, repeating steps (e)–(g) for each remaining external battery;
   i) applying a top-off charge to each internal battery charged in steps (a)–(d) until each internal battery is fully charged; and
   j) applying a top-off charge to each external battery charged in steps (e)–(h) until each external battery is fully charged.

8. The battery-charging method of claim 7, wherein each battery is charged to near-full capacity during the fast-charging steps (c) and (g).

9. The method of claim 8, wherein the charging time required to charge each battery to near-full capacity is substantially shorter than the total charging time required to charge each battery to full capacity.

10. A battery-charging apparatus for charging an internal and an external battery of a portable phone power supply assembly, wherein the phone includes a power line for supplying power to the phone, comprising:
   a) a control unit, including a first and a second detector capable of detecting voltages supplied by the internal and external batteries, wherein the control unit is operatively coupled to the internal and external batteries and wherein the control unit controls connection of the batteries to the phone power line;
   b) an external voltage input operatively connected to the control unit for supplying a charge input to a selected battery, the control unit further including a detector for detecting when the charge input is connected to a charging device, and further including a selector for selectively connecting the charge input to either the internal or external battery; and
   c) a micro-controller, in electrical communication with the control unit, wherein the micro-controller determines when a selected battery requires charging, and wherein the micro-controller directs the control unit to connect the charge input to the selected battery that requires recharging, and wherein each battery is charged to near-full capacity using a software-controlled multi-phase battery-charging technique.

11. The battery-charging apparatus of claim 10, wherein the multi-phase battery-charging technique comprises first applying a trickle-charge to the selected battery until the battery voltage exceeds a pre-determined voltage threshold, and then applying a fast-charge to the selected battery until the selected battery is charged to near-full capacity.

12. The battery-charging apparatus claim 11, wherein the multi-phase battery-charging technique further comprises applying a top-off charge to the selected battery and thereby fully charging the selected battery.

13. A computer program executable on a general purpose computing device, wherein the program is capable of controlling the connection of an internal and external battery of a portable phone to a charging device, and wherein the program detects when a selected battery requires charging by detecting the output voltage of each battery and determining when the selected battery's output voltage decreases below a pre-determined cut-off voltage, comprising:
   a) a first set of instructions for comparing the output voltage of the internal battery to a pre-determined cut-off voltage;
   b) a second set of instructions for applying a trickle-charge to the internal battery when the output voltage of the internal battery is less than the cut-off voltage, wherein the trickle-charge is applied until the output voltage of the internal battery exceeds the cut-off voltage;
   c) a third set of instructions for applying a fast-charge to the internal battery until the internal battery voltage exceeds a pre-determined voltage threshold;
   d) a fourth set of instructions for comparing the output voltage of the external battery to the pre-determined cut-off voltage;
   e) a fifth set of instructions for applying a trickle-charge to the external battery if the output voltage of the external battery is less than the cut-off voltage, wherein the trickle-charge is applied until the output voltage of the external battery exceeds the cut-off voltage;
   f) a sixth set of instructions for applying a fast-charge to the external battery until the output voltage of the external battery exceeds the pre-determined voltage threshold;
   g) a seventh set of instructions for applying a top-off charge to the internal battery until the internal battery is fully charged; and
   h) an eighth set of instructions for applying a top-off charge to the external battery until the external battery is fully charged.

14. The computer program of claim 13, wherein the program is executed by a general purpose computing device in the portable phone.

15. The computer program of claim 13, wherein the program is executed by a field programmable gate array device in the portable phone.

16. The computer program of claim 13, wherein the program is executed by a micro-controller in the portable phone.

* * * * *